(12) United States Patent
Baumgarte et al.

(10) Patent No.: US 9,794,231 B2
(45) Date of Patent: Oct. 17, 2017

(54) LICENSE MANAGEMENT USING CLOUD BASED ENROLLMENT

(71) Applicant: Schlage Lock Company LLC, Indianapolis, IN (US)

(72) Inventors: Joseph Wayne Baumgarte, Carmel, IN (US); Patrick GrandPre, Carmel, IN (US); Matthew Dexter, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 185 days.

(21) Appl. No.: 14/659,342

(22) Filed: Mar. 16, 2015

(65) Prior Publication Data

US 2016/0277362 A1     Sep. 22, 2016

(51) Int. Cl.
*H04L 29/06*     (2006.01)
*H04L 29/08*     (2006.01)
*H04W 4/00*     (2009.01)

(52) U.S. Cl.
CPC .......... *H04L 63/0428* (2013.01); *H04L 67/02* (2013.01); *H04L 67/10* (2013.01); *H04W 4/003* (2013.01)

(58) Field of Classification Search
None
See application file for complete search history.

(56) References Cited

U.S. PATENT DOCUMENTS

| | | | |
|---|---|---|---|
| 5,790,664 A | 8/1998 | Coley et al. | |
| 7,203,966 B2 | 4/2007 | Abburi et al. | |
| 7,318,236 B2 | 1/2008 | DeMello et al. | |
| 7,747,851 B1 | 6/2010 | Robinson et al. | |
| 8,336,090 B2 | 12/2012 | Ache et al. | |
| 8,566,960 B2* | 10/2013 | Richardson | G06F 21/10 380/201 |
| 2006/0073890 A1* | 4/2006 | McAllister | A63F 13/12 463/29 |
| 2007/0188351 A1 | 8/2007 | Brown et al. | |
| 2007/0296545 A1 | 12/2007 | Clare | |
| 2008/0262968 A1* | 10/2008 | Saxena | G06F 21/10 705/51 |
| 2009/0006403 A1* | 1/2009 | McKenney | G06F 9/52 |
| 2010/0323790 A1 | 12/2010 | Etchegoyen | |
| 2012/0095877 A1 | 4/2012 | Ciudad et al. | |

(Continued)

OTHER PUBLICATIONS

International Search Report; International Searching Authority, US Patent and Trademark Office; International Application No. PCT/US2016/022605; Jun. 30, 2016; 4 pages.

(Continued)

*Primary Examiner* — Samson Lemma
*Assistant Examiner* — Carlos Amorin
(74) *Attorney, Agent, or Firm* — Taft Stettinius & Hollister LLP

(57) ABSTRACT

Systems and methods are disclosed for registering a host computing device at a server and registering a lock device at the server via an application running on a mobile computing device, each being provided host keys from the server that allow communication between the host computing device the lock device. Further, the lock device can only be registered with the server if a current registered device count is less than a maximum registered device threshold.

20 Claims, 6 Drawing Sheets

(56) References Cited

U.S. PATENT DOCUMENTS

| | | |
|---|---|---|
| 2012/0204032 A1 | 8/2012 | Wilkins et al. |
| 2013/0318624 A1 | 11/2013 | Monsifrot et al. |
| 2014/0115493 A1* | 4/2014 | Kim .................... H04W 12/08 |
| | | 715/748 |
| 2016/0042581 A1* | 2/2016 | Ku .................... G07C 9/00309 |
| | | 340/5.61 |
| 2016/0180618 A1* | 6/2016 | Ho .................... G07C 9/00571 |
| | | 340/5.52 |
| 2016/0189503 A1* | 6/2016 | Johnson ............. G07C 9/00944 |
| | | 348/152 |
| 2016/0267730 A1* | 9/2016 | Wadhwani .......... H04L 63/0853 |

OTHER PUBLICATIONS

Written Opinion; International Searching Authority, US Patent and Trademark Office; International Application No. PCT/US2016/022605; Jun. 30, 2016; 6 pages.

\* cited by examiner

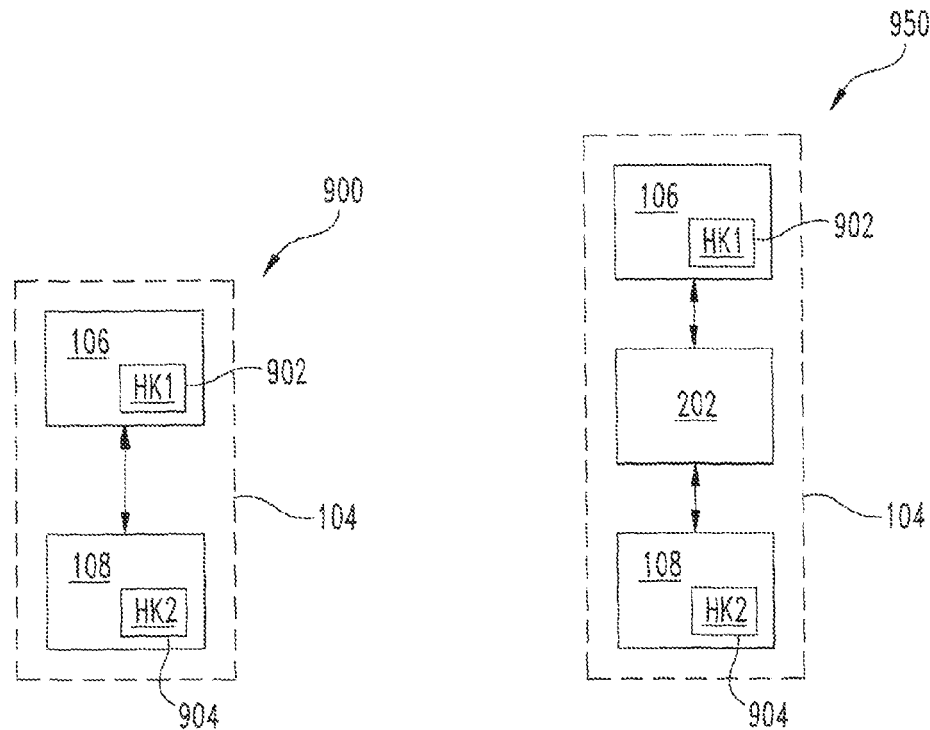
Fig. 9A    Fig. 9B
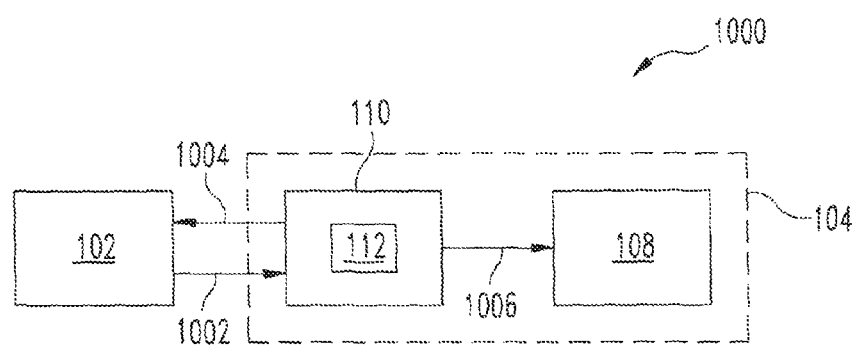
Fig. 10

LICENSE MANAGEMENT USING CLOUD BASED ENROLLMENT

BACKGROUND

The present application generally relates to license management, and in particular relates to regulating the number of electronic lock device licenses via a remote cloud server for a particular site (i.e., physical location). License management servers are widely used today in applications such as digital rights management applications for controlling licensed media/software to only run on a fixed number of authorized devices. Similar license management servers typically run a web server software application that manages a number of authorized devices that can be registered on a per server basis. Current solutions are aimed at an authorized installer (e.g., an original equipment manufacturer (OEM) installer) providing a client with a license for each device at a local server managed by the authorized installer, where at least a portion of the license is used by the web server running on the local server to determine the limit on the number of devices that can be registered at the local server. However, such current solutions allow for non-authorized third party installers to add devices to the local server post-initial install, which can result in inefficiencies to the authorized installer managed local server and/or loss of income attributable to license fees associated with the third party installed devices. Therefore, further technological developments are desirable in this area.

SUMMARY

Systems and methods are disclosed for authorizing lock devices at a remote server using an application running on a mobile computing device. One embodiment is directed to a unique system and method for providing a host key to a host computing device and one or more lock devices at a site from a remote server upon receiving a registration request from each of the host computing device and the one or more locks.

This summary is provided to introduce a selection of concepts that are further described below in the illustrative embodiments, but is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein:

FIGS. 9A and 9B are schematic block diagrams illustrating the communication flow between a registered lock device and a host computing device; and FIG. 10 is schematic block diagram illustrating the communication flow for unregistering a registered lock device at a server.

DESCRIPTION OF ILLUSTRATIVE EMBODIMENTS

Figure 1:
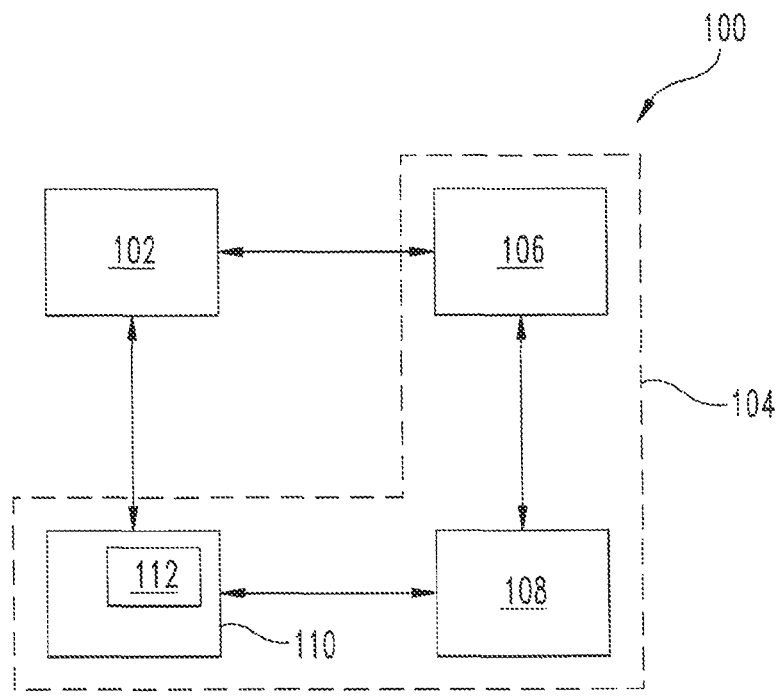
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
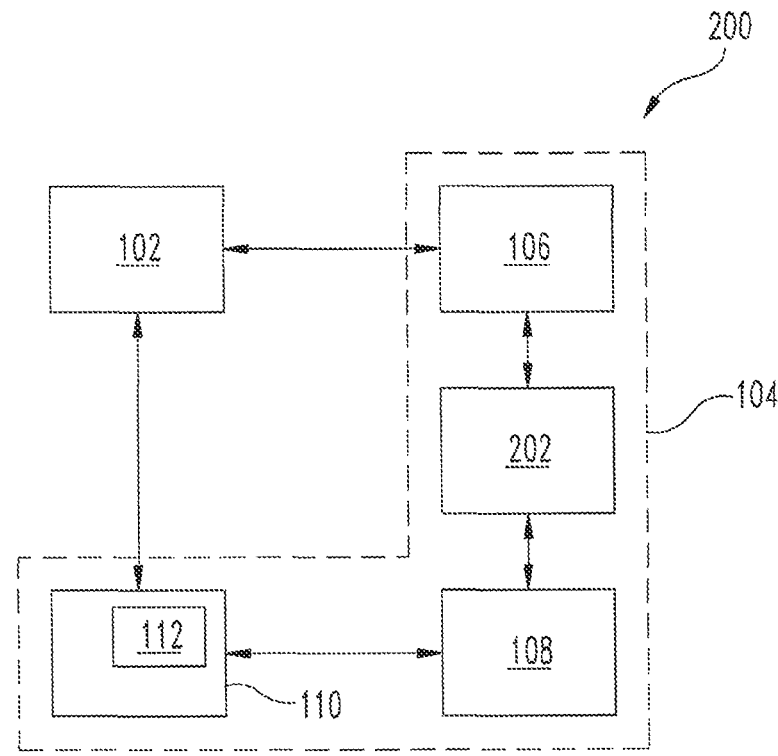
FIG. 2 is a schematic block diagram of the exemplary system of FIG. 1 including an intermediary communication device.

FIGS. 1 and 2 illustrate schematic views of license management systems using web based enrollment. With reference to FIG. 1, shown therein is a schematic view of a system 100 that includes a server 102 in wireless communication with a host computing device 106 and a mobile computing device 110. As illustrated in FIG. 1, the host computing device 106 and the mobile computing device 110 are located at a site 104, remote from the server 102. The site 104 may include a residential home or a commercial office building that generally houses the host computing device 106. The server 102 may function as a cloud server having a cloud application installed that is configured to process configuration data and/or facilitate communication via the Internet through a web portal, or web server, to the host computing device 106 and the mobile computing device 110.

The system 100 further includes a lock device 108, also located at the site 104. The lock device 108 may include any type of connected security device such as an electronic door lock, a strike, a reader, a door closer, and the like. For example, the site 104 may include one or more lock devices 108 that each control access to a certain designated area of the site 104. In one such exemplary embodiment, where a building includes a first building access point (e.g., a door at the front of the building) and a second building access point (e.g., a door at the back of the building), a first lock device may be positioned to allow access to the first building access point, and a second lock device may be positioned to allow access to the second building access point. It should be noted that in certain non-limiting embodiments, one or more of the lock devices 108 may be located external to the building, but because of their proximity to the building (e.g., mounted on an external wall of the building), they are still considered to be located at the site 104 for the purposes of this application.

In the system 100, the host computing device 106 is in communication with the server 102 via the Internet, thereby allowing communication generally from any location with an Internet connection. The host computing device 106 may be any computing device operable to communicate with the server 102 over a wide area network (WAN), such as the Internet, and the lock device 108 over a local area network (LAN), such as via Z-wave, and Bluetooth, for example. In certain embodiments the LAN may be a wireless local area network (WLAN).

In certain embodiments, the host computing device 106 may include any type of computing device (e.g., laptop, desktop, etc.) that includes a memory and a processor sufficient in size and operation to store and manipulate a database and one or more applications for communicating with the lock device 108 and the server 102. In certain other embodiments, the host computing device 106 may be include a web server, or web portal, for managing communications between the server 102 and the host computing device 106 via the Internet.

The mobile computing device 110 may be any type of mobile computing device capable of running applications and communicating with external devices using both short range (i.e., Wi-Fi, Z-wave, Bluetooth, etc.) and long range (e.g., telecommunication technology) wireless communication means, such as a smart phone, a tablet, a laptop, and the like. The mobile computing device 110 may be in wireless communication (i.e., Bluetooth communication) with the lock device 108 when the mobile computing device 110 is in or near the site 104. In certain embodiments, the mobile computing device 110 may alternatively be in wired communication with the lock device 108.

The mobile computing device 110 includes an application 112 that is structured to run on the mobile computing device 110. In certain embodiments, the application 112 may function as a background service application (i.e., always running in the background) or as a typical user initiated application (i.e., only runs upon user initiated request). The application 112 typically includes a graphical user interface (GUI) for displaying data to and receiving input from an end user of the mobile computing device 110. In certain embodiments, the application 112 may only be allowed certain access and/or functionality based on an administrator privilege associated with a login credential for the application 112.

In the system 100, the mobile computing device 110 is in communication with the server 102 via the Internet, thereby allowing communication generally from any location with an Internet connection. In certain embodiments, the communication between the mobile computing device 110 and the server 102 may take place over a 3G/4G/LTE data connection on a wireless telecommunications carrier network, or over any other long range wireless data transfer protocol or mobile telecommunications technology known in the art.

With reference to FIG. 2, there is shown a schematic view of a system 200 that includes the server 102, the host computing device 106, the lock device 108, and the mobile computing device 110 as illustrated in FIG. 1. Similar to FIG. 1, the host computing device 106 and the mobile computing device 110 are located remotely from the server 102 at the site 104. The system 200 additionally includes an intermediary device 202 (i.e., a gateway) at the site 104 that is structured to facilitate communications between the host computing device 106 and the lock device 108. The network connection communication channel between the intermediary device 202 and the host computing device 106, and the intermediary device 202 and the lock device 108, may be a wired and/or a wireless network connection communication channel. In certain embodiments, the network connection communication channel may be a i-Wave wireless mesh network, a Zigbee wireless mesh network, an 802.11 wireless network, TCP/IP over Ethernet, a proprietary radio protocol, a proprietary wired communication protocol, NFC, Bluetooth, or any other suitable network connection communication channel.

Figure 3:
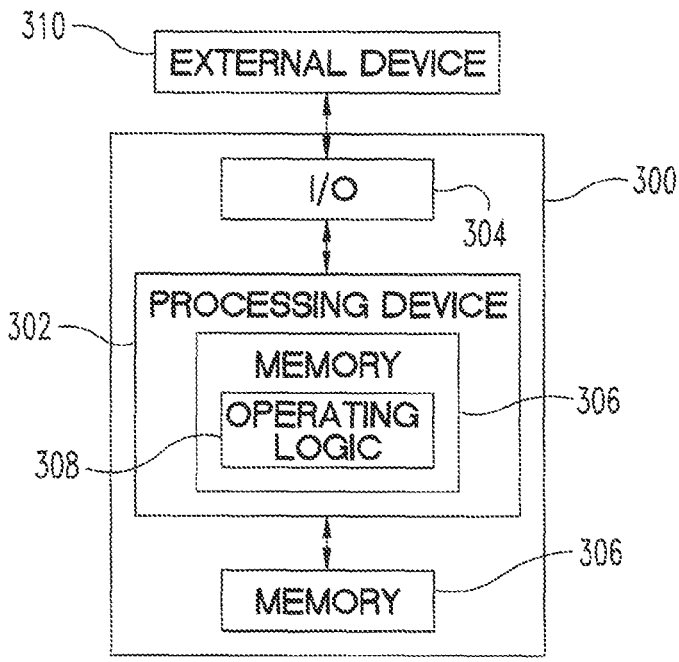
FIG. 3 is a schematic block diagram of an exemplary computing device.

FIG. 3 is a schematic block diagram of a computing device 300. The computing device 300 is one example of the host computing device 106 and/or the mobile computing device 110 shown in FIGS. 1 and 2. The computing device 300 includes a processing device 302, an input/output device 304, memory 306, and operating logic 308. Furthermore, the computing device 300 communicates with one or more external devices 310, such as the server 102 illustrated in FIG. 1, for example.

The input/output device 304 allows the computing device 300 to communicate with the external device 310. For example, the input/output device 304 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 304 may be include hardware, software and/or firmware. It is contemplated that the input/output device 304 will include more than one of these adapters, cards or ports.

The external device 310 may be any type of device that allows data to be inputted or outputted from the computing device 300. For example, the external device 310 may be a control device, a router, a bridge, an operating device, a mobile computing device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 310 may be integrated into the computing device 300. It is further contemplated that there may be more than one external device in communication with the computing device 300.

The processing device 302 can be a programmable type, a dedicated, hardwired state machine, or any combination of these. The processing device 302 may further include multiple processors, Arithmetic-Logic Units (ALUs), Central Processing Units (CPUs), Digital Signal Processors (DSPs), or the like. The processing devices 302 with multiple processing units may utilize distributed, pipelined, and/or parallel processing. The processing device 302 may be dedicated to performance of just the operations described herein or may be utilized in one or more additional applications. In the depicted form, the processing device 302 is of a programmable variety that executes algorithms and processes data in accordance with the operating logic 308 as defined by programming instructions (such as software or firmware) stored in memory 306. Alternatively or additionally, the operating logic 308 for the processing device 302 is at least partially defined by hardwired logic or other hardware. The processing device 302 may include one or more components of any type suitable to process the signals received from input/output device 304 or elsewhere, and to provide desired output signals. Such components may include digital circuitry, analog circuitry, or a combination of both.

The memory 306 may be of one or more types, such as a solid-state variety, electromagnetic variety, optical variety, or a combination of these forms. Furthermore, the memory 306 can be volatile, nonvolatile, or a combination of these types, and some or all of the memory 306 can be of a portable variety, such as a disk, tape, memory stick, cartridge, or the like. In addition, the memory 306 can store data that is manipulated by the operating logic 308 of the processing device 302, such as data representative of signals received from and/or sent to the input/output device 304 in addition to or in lieu of storing programming instructions defining operating logic 308, just to name one example. As shown in FIG. 2, the memory 306 may be included with the processing device 302 and/or coupled to the processing device 302.

Figure 4:
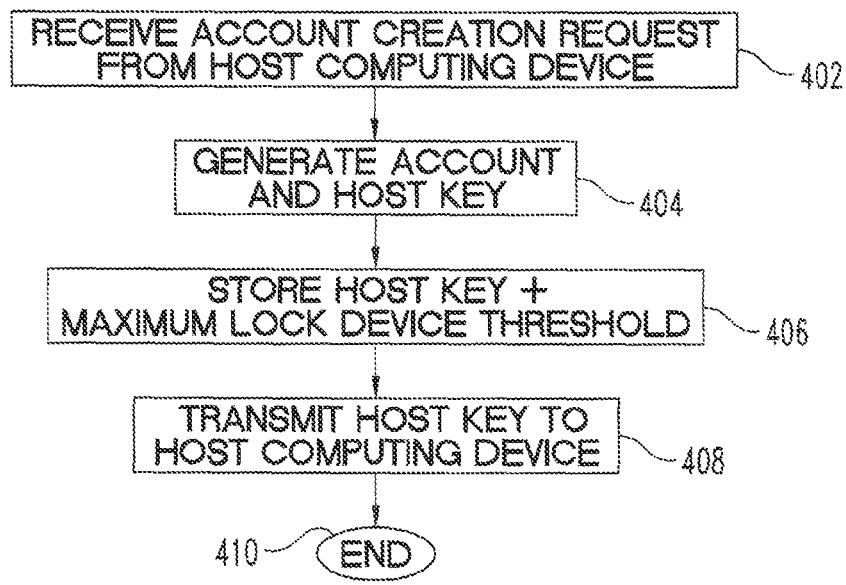
FIG. 4 is a flow diagram of a procedure for registering a host computing device.
Figure 5:
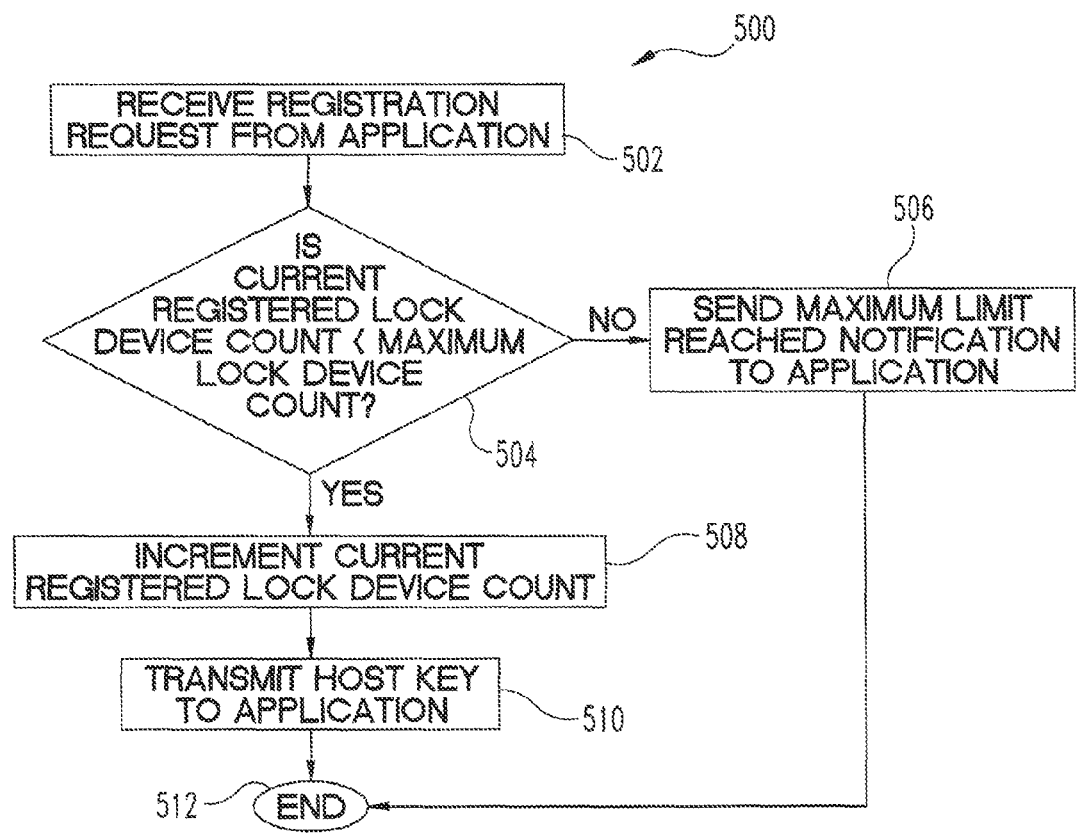
FIG. 5 is a flow diagram of a procedure for registering a lock device.
Figure 6:
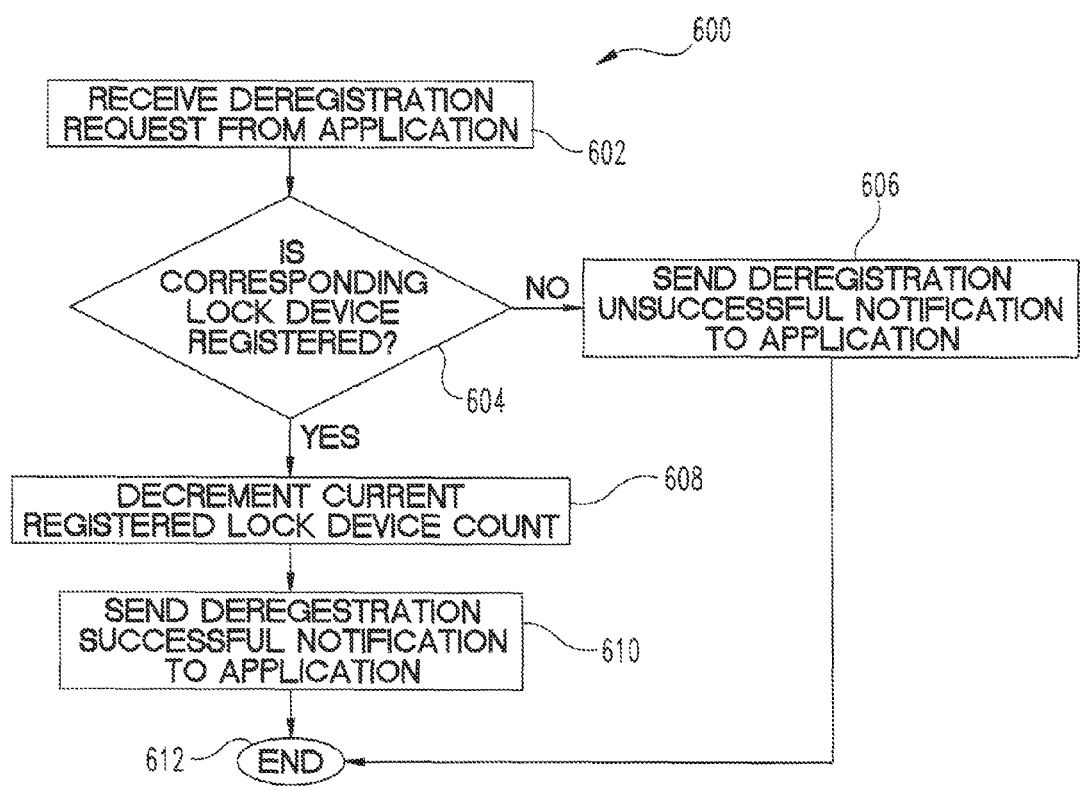
FIG. 6 is a flow diagram of a procedure for unregistering a registered lock device.

The schematic flow diagrams in FIGS. 4-6 and the related description which follows provide illustrative embodiments of performing procedures for licensing lock devices such as, for example, the lock device 108 illustrated in FIG. 1. Operations illustrated are understood to be exemplary only, and operations may be combined or divided, and added or removed, as well as re-ordered in whole or part, unless stated explicitly to the contrary herein. Certain operations may be implemented by a computer, such as the server 102, executing a computer program product on a non-transitory computer readable medium, such as the application 112, where the computer program product comprises instructions causing the computer to execute one or more of the operations, or to issue commands to other devices to execute one or more of the operations.

The procedure 400 illustrated in FIG. 4 for creating a host computing device account may be put into operation for use in, for example, the systems 100, 200. The procedure 400 begins at operation 402, in which an account creation request is received at the server 102 from the host computing device 106. The account creation request may include an account holder identifier for associating an account holder (e.g., an original equipment manufacturer (OEM) installer) with the host computing device 106, a site identifier for associating the site 104 with the account, a maximum lock device threshold for associating a maximum number of lock devices 108 that can be registered to the host computing device 106 at the site 104. In certain embodiments, the server 102 may include a web portal accessible based on user credentials input through a thin client via a web browser running on the host computing device 106 and/or a thick client installed on the host computing device 106.

From operation 402, the procedure 400 continues to operation 404, where the server 102 generates an account and a host key for the host computing device 106. In certain embodiments, the host key may be generated based at least in part on the site 104 and/or may be encrypted. In certain embodiments, the host key may be additionally or alternatively based, at least in part, on a master key stored at the server 102. From operation 404, procedure 400 continues to operation 406 where the host key and/or the maximum lock device threshold are stored at the server 102 such as, for example, in a database at the server 102. Procedure 400 continues from operation 406 to operation 408, where the host key is transmitted from the server 102 to the host computing device 106 before proceeding to operation 408, thereby ending the procedure 400.

The procedure 500 illustrated in FIG. 5 for registering one of the lock devices 108 with the server 102 may be put into operation for use in, for example, the systems 100, 200. The procedure 500 begins at operation 502, where a registration request is received at the server 102 from a mobile computing device, such as the mobile computing device 110 illustrated in FIG. 1. In certain embodiments, the registration request may include an identifier corresponding to the lock device 108 to be registered with the registration request, the site 104 at which the lock device 108 is being installed, and/or an account identifier corresponding to the account of an installer or administrator of the lock device 108.

From operation 502, the procedure 500 continues to conditional 504, where a current registered device count stored at the server 102 is compared against the maximum lock device threshold stored at the server 102. If the current registered device count is equal to the maximum lock device threshold, procedure 500 continues to operation 506, where a notification is sent from the server 102 to the mobile computing device 110 for display on the application 112 before continuing to operation 512, ending the procedure 500. If the current registered device count is less than the maximum lock device threshold, procedure 500 continues to operation 508, where and the current registered device count is incremented. Procedure 500 then continues to operation 510 where the host key is transmitted to the mobile computing device 110, before procedure 500 continues to operation 512, thereby ending the procedure 500.

After the host key is transmitted to the mobile computing device 110, the mobile computing device 110 may then forward the host key to the lock device 108 corresponding to the registration request received at operation 502. After receiving the host key, the lock device 108 can then initiate communicate with the host computing device 106 based at least in part on the host key. In one non-limiting example, the lock device 108 and the host computing device 106 perform an authentication "handshake" based at least in part on the host key, allowing the host computing device 106 to validate the lock device 108 has been registered, enabling communication between the host computing device 106 and the registered lock device 108.

The procedure 600 illustrated in FIG. 6 for unregistering one of the lock devices 108 previously registered with the server 102 may be put into operation for use in, for example, the systems 100, 200. The procedure 600 begins at operation 602, where a deregistration request is received at the server 102 from the mobile computing device 110. In certain embodiments, the deregistration request may include the identifier corresponding to the lock device 108 to be unregistered.

From operation 602, the procedure 600 continues to conditional 604, where it is determined whether a registered lock device 108 corresponding to the deregistration request is registered at the server 102. It is contemplated that in certain embodiments the server 102 may only keep a count of the lock devices 108 that have been registered, and not any identifiers corresponding to any of the lock devices 108 that have been registered. If it is determined the registered lock device 108 may not be unregistered, procedure 600 continues to operation 606, where an unsuccessful notification is sent from the server 102 to the mobile computing device 110 for display on the application 112 to indicate the registered lock device 108 may not be unregistered before procedure 600 proceeds to operation 612, thereby ending the procedure 600. If it is determined that the registered lock device 108 may be unregistered, procedure 600 continues to operation 608, where the current registered device count is decremented. In certain embodiments, where additional information is saved at the server 102 corresponding to the registered lock device 108, in addition to the current registered device count being decremented, the registered lock device 108 may require additional steps to be taken at the server 102 to unregister the registered lock device 108, such as removing an identifier corresponding to the registered lock device saved at the server 102, for example.

From operation 608, procedure 600 continues to operation 610, where a successful notification is transmitted from the server 102 to the mobile computing device 110 for display on the application 112 to indicate the lock device 108 was successfully unregistered before procedure 600 proceeds to operation 612, ending the procedure 600. In certain embodiments, a deregistration command may transmitted from the mobile computing device 110 to the lock device 108 corresponding to the deregistration request received at operation 602, causing the mobile computing device 110 to delete the host key stored in memory at the lock device 108, for example.

Figure 7:
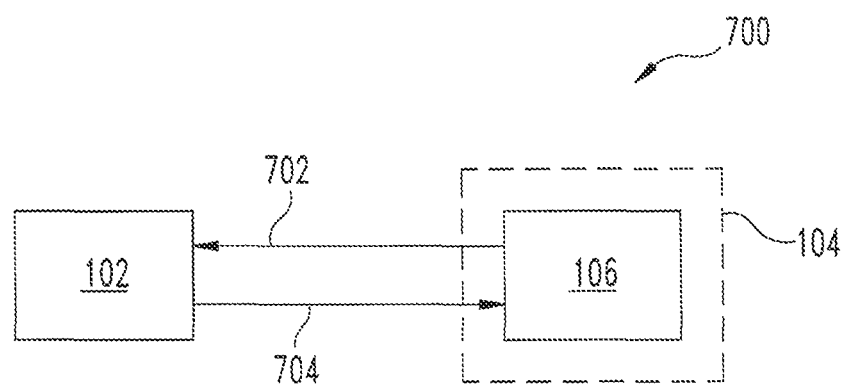
FIG. 7 is schematic block diagram illustrating the communication flow for registering a host computing device at a server.

FIGS. 7-10 are schematic block diagrams illustrating example embodiments of the data communication flow of each of the processes illustrated in FIGS. 4-6 between the system 100, 200 components illustrated in FIGS. 1 and 2. With reference to FIG. 7, there is illustrated an embodiment 700 of a communication between the host computing device 106 and the server 102 for creating an account for the host computing device 106 at the server 102. An account creation request 702 is sent from the host computing device 106 and received at the server 102. In response to receiving the account creation request 702, the server 102 may create an account at the server 102 based at least in part on information contained in the account creation request 702. In certain embodiments, the account creation request 702 may contain a site identification value (e.g., an identifier corresponding to the site 104), a maximum registered lock device threshold, a host computing device 106 identification value, and/or an administrator identification value (e.g., an email address corresponding to the administrator account).

The server 102, after creating the account, further generates a host key and transmits host key data 704 to the host computing device 106. In certain embodiments, the host key may be generated based on a master key stored at the server 102 and/or be encrypted based on an encryption scheme stored at the server 102. In certain embodiments, the host key may additionally or alternatively be based on at least one of the site identification value, the host computing device identification value, and/or the administrator identification value.

In certain embodiments, an account update request (not shown) may be transmitted from the host computing device 106 to the server 102 after an account has been created at the server 102 for the host computing device 106. The account update request may include an updated maximum registered lock device threshold. After the server 102 has received the account update request, the server 102 may update the previously stored maximum registered lock device threshold with the updated maximum registered lock device threshold. The updated maximum registered lock device threshold may be greater than or less than the previously stored maximum registered lock device threshold. In certain embodiments, where the updated maximum registered lock device threshold is less than the previously stored maximum registered lock device threshold, the operator of the host computing device may be notified by a communication from the server indicating that one or more registered lock devices need to be unregistered before the update can be made at the server 102.

For example, in an instance where an installer is at the site 104 adding an additional lock device 108, the server 102 may provide an indication that the current registered lock device count may be equal to the maximum registered lock device threshold when the installer attempts to add the additional lock device 108. In such an instance, to accommodate the installation of the additional lock device 108, the installer would need to perform an operation on the host computing device 106, causing the host computing device 106 to set the updated maximum registered lock device threshold at the server 102 to a greater value than the previously stored maximum registered lock device threshold before attempting to add the lock device again.

Figure 8:
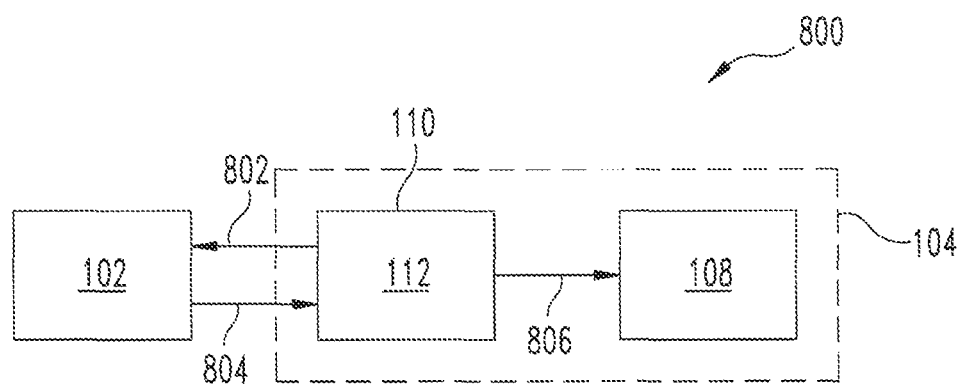
FIG. 8 is schematic block diagram illustrating the communication flow for registering a lock device at a server via an application running on a mobile device.

With reference to FIG. 8, provided therein is an illustration of an embodiment 800 of a communication between the lock device 108, the mobile computing device 110, and the server for registering the lock device 108 with the server 102. A lock device registration request 802 is sent from the mobile computing device 110, via the application 112 running on the mobile computing device 110, to the server 102. The lock device registration request 802 may be initiated by an authorized user of the application and/or include a site identification value, a lock device identification value, and/or an administrator identification value.

It is contemplated that in certain embodiments each of the site identification value and the administrator identification value included in the account creation request 702 may be the same site identification value and administrator identification value included in the lock device registration request. In certain embodiments, the lock device registration request 802 may be initiated by an operator of the mobile computing device 110 via the application 112, by the mobile computing device 110 coming into communication proximity with the lock device 108, or a combination thereof.

After the server 102 has received the lock device registration request 802, the server 102 generates a host key, increments a current registered lock device count stored at the server 102, and transmits host key data 804 including the host key to the mobile computing device 110. In certain embodiments, the host key data 804 may additionally include the site identification value associated with the lock device registration request 802 to map the current registered lock device count with the site 104.

In certain embodiments, the host key may be generated based on a master key stored at the server 102 and/or be encrypted based on an encryption scheme stored at the server 102. In certain embodiments, the host key generated at the server 102 in response to the lock device registration request 802 may be the same host key generated at the server 102 in response to the account creation request 702. After receiving the host key data 804 from the server 102, the mobile computing device 110 may then transmit a host key update command 806 including the host key to the lock device 108 corresponding to the lock device registration request 802.

With reference to FIGS. 9A and 9B, there is illustrated a first embodiment 900 of the host computing device 106 communicating directly with the lock device 108 and a second embodiment 950 of the host computing device 106 communicating with the lock device 108 through the intermediary device 202. In the first embodiment 900, the host computing device 106 and the lock device 108 can communicate based on a first host key 902 and a second host key 904. In certain embodiments, the first host key 902 and the second host key 904 may be the same host key. In certain other embodiments, the first host key 902 and the second host key 904 may not be the same, but at least a portion of each of the first and second host keys 902, 904 may be the same. In such an embodiment, it is contemplated that the first host key 902 may be used to determine whether the second host key 904 is valid (i.e., whether the host computing device 106 is authorized to communicate with the lock device 108), and vice versa, for example.

The second embodiment 950 of FIG. 9B is similar to the first embodiment 900 of FIG. 9A, but includes an intermediary device 202 that is operable to facilitate the transfer of data between the lock device 108 and the host computing device 106. Similar to the first embodiment 900, only the host computing device 106 and the lock device 108 have host keys, the first host key 902 and the second host key 904, respectively.

With reference to FIG. 10, there is illustrated an embodiment 1000 of a communication between the lock device 108, the mobile computing device 110, and the server 102 for unregistering the previously registered lock device 108 from the server 102. A lock device deregistration request 1002 is sent from the mobile computing device 110 using the application 112 running on the mobile computing device 110 to the server 102. The lock device deregistration request 1002 may include the site identification value, the lock device identification value, and/or the administrator identification value used to register the lock device 108.

After the server 102 has received the lock device deregistration request 1002, the server 102 decrements the current registered lock device count stored at the server 102, and transmits a host key deletion command 1004 to the mobile computing device 110. After receiving the host key deletion command 1004 from the server 102, the mobile computing device 110 then transmits a host key delete command 1006 to the lock device 108 corresponding to the lock device deregistration request 1002, which may cause the lock device 108 corresponding to the lock device deregistration request 1002 to delete the stored host key.

Certain operations described herein include operations to interpret or determine one or more parameters. Interpreting and/or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

One aspect of the present application includes a method, comprising: receiving, at a server, a maximum lock device threshold from a host computing device; generating, at the server, a site specific encryption key; transmitting, from the server, a first site specific encryption key to the host computing device receiving the registration request; receiving, at the server, a registration request corresponding to an electronic lock device from an application running on a mobile computing device, the mobile computing device in data communication with the electronic lock device; in response to a current registered device count being less than the maximum lock device threshold: registering the electronic lock device and incrementing the current registered device count at the server; and transmitting, from the server, a second site specific encryption key to the registered electronic lock device via the application running on the mobile computing device, wherein the first and second site specific encryption keys allow the host computing device and the electronic lock device to communicate.

Features of the aspect may include: receiving, at the server, a deregistration request for a registered electronic lock device through the application running on the mobile computing device; unregistering, at the server, the registered electronic lock device corresponding to the deregistration request; and decrementing, at the server, the current registered device count; wherein the server includes a cloud-based web portal hosted on the server, and wherein the cloud-based web portal is structured to transmit and receive data between the mobile computing device and the server, and the host computing device and the server; wherein the host computing device is administered by a first administrative entity for installing the electronic lock device at a site and the server is administered by a second administrative entity for providing lock license management, and wherein the first administrative entity is an original equipment manufacturer (OEM) and the second administrative entity is an electronic lock device manufacturer; receiving, at the server, an account activation request from the host computing device; and creating, at the server, an account corresponding to the account activation request, the account authorizing communication between the host computing device and the server, wherein the maximum lock device threshold is assigned to the account in response to receiving the maximum lock device threshold from the host computing device; wherein the maximum lock device threshold is a site-specific device threshold; wherein the server and the host computing device communicate via the Internet; wherein the mobile computing device and the electronic lock device communicate via a first wireless communication protocol, and the mobile computing device and the server communicate via a second wireless communication protocol; wherein the host computing device is structured to communicate with at least one of an intermediary communication device and each of the registered electronic lock devices.

Another aspect of the present application includes a system, comprising: a server structured to host a web portal and communicate with a host computing device and a mobile computing device via the web portal, the mobile computing device structured to communicate with one or more electronic locks and the web portal via an application installed on the mobile computing device; wherein the web portal is structured to: receive a maximum lock device threshold from the host computing device; transmit a first site specific encryption key to the host computing device; receive a registration request that corresponds to one of the electronic locks from the application on the mobile computing device; and in response to a current registered device count being less than the maximum lock device threshold, register the electronic lock, increment the current registered device count, and transmit a second site specific encryption key to the electronic lock via the application installed on the mobile computing device, and wherein the host computing device is structured to communicate with registered electronic locks using the first and second site specific encryption keys.

Features of the aspect may include: wherein the web portal includes a database structured to store the maximum lock device threshold, the current registered device count, and the first site specific encryption key, and wherein the web portal further includes a cloud application structured to communicate with the host computing device; wherein the host computing device includes a database structured to store lock information corresponding to each of the electronic locks; wherein the web portal is further structured to: receive a deregistration request that corresponds to one of the registered electronic locks from the application on the mobile computing device; unregister the electronic lock corresponding to the deregistration request; and decrement the current registered device count; wherein the host computing device is authorized to communicate with each of the registered electronic locks; further comprising a gateway structured to facilitate communication between the host computing device and each of the registered electronic locks; wherein the mobile computing device comprises one of a smartphone and a tablet computer.

Another aspect of the present application may include a method, comprising: receiving, at a server, a registration request corresponding to a lock device located at a site from an application running on a mobile computing device; comparing, at the server, a maximum registered lock threshold to a current registered lock count in response to receiving the registration request, each of the maximum registered lock threshold and the current registered lock count corresponding to the site; and in response to the current registered lock count being less than the maximum registered lock threshold: incrementing, at the server, the current registered lock count of the site; and transmitting, from the server to the application running on the mobile computing device, a first host key, wherein the application is in data communication with the lock device and is structured to transmit a second host key to the lock device.

Features of the aspect may include: receiving, at the server, an account activation request from a host computing device remote from the server, the account activation request including at least the maximum registered lock threshold and a site identifier, the site identifier corresponding the site of the lock device and the host computing device; generating, at the server, the first host key in response to receiving the account activation request; storing, at the server, the maximum registered lock threshold, the site identifier, and the first host key; and transmitting, from the server, the first host key to the host computing device; wherein the host computing device is structured to communicate with one or more of the registered lock devices corresponding to the first host key; receiving, at the server, a deregistration request corresponding to an electronic lock device from the application running on the mobile computing device, wherein the electronic lock was previously registered; unregistering, at the server, the electronic lock device corresponding to the deregistration request in response to receiving the deregistration request; decrementing, at the server, the current registered lock count in response to unregistering the registered electronic lock; and transmitting, from the server, an unregistered status to the application running on the mobile computing device to remove the second host key from the electronic lock device corresponding to the deregistration request.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   receiving, at a server, a maximum lock device threshold from a host computing device;
   generating, at the server, a site specific encryption key;
   transmitting, from the server, a first site specific encryption key to the host computing device receiving the registration request;
   receiving, at the server, a registration request corresponding to an electronic lock device from an application running on a mobile computing device, the mobile computing device in data communication with the electronic lock device;
   in response to a current registered device count being less than the maximum lock device threshold:
      registering the electronic lock device and incrementing the current registered device count at the server; and
      transmitting, from the server, a second site specific encryption key to the registered electronic lock device via the application running on the mobile computing device;
   wherein the first and second site specific encryption keys allow the host computing device and the electronic lock device to communicate.

2. The method of claim 1, further comprising:
   receiving, at the server, a deregistration request for a registered electronic lock device through the application running on the mobile computing device;
   unregistering, at the server, the registered electronic lock device corresponding to the deregistration request; and
   decrementing, at the server, the current registered device count.

3. The method of claim 1, wherein the server includes a cloud-based web portal hosted on the server; and
   wherein the cloud-based web portal is structured to transmit and receive data between the mobile computing device and the server, and the host computing device and the server.

4. The method of claim 1, wherein the host computing device is administered by a first administrative entity for installing the electronic lock device at a site and the server is administered by a second administrative entity for providing lock license management; and
   wherein the first administrative entity is an original equipment manufacturer (OEM) and the second administrative entity is an electronic lock device manufacturer.

5. The method of claim 4, further comprising:
   receiving, at the server, an account activation request from the host computing device; and
   creating, at the server, an account corresponding to the account activation request, the account authorizing communication between the host computing device and the server; and
   wherein the maximum lock device threshold is assigned to the account in response to receiving the maximum lock device threshold from the host computing device.

6. The method of claim 1, wherein the maximum lock device threshold is a site-specific device threshold.

7. The method of claim 1, wherein the server and the host computing device communicate via the Internet.

8. The method of claim 1, wherein the mobile computing device and the electronic lock device communicate via a first wireless communication protocol, and the mobile computing device and the server communicate via a second wireless communication protocol.

9. The method of claim 1, wherein the host computing device is structured to communicate with at least one of an intermediary communication device and each of the registered electronic lock devices.

10. The method of claim 1, further comprising:
    receiving, at the server, a deregistration request corresponding to an electronic lock device from the application running on the mobile computing device, wherein the electronic lock device was previously registered;

unregistering, at the server, the electronic lock device corresponding to the deregistration request in response to receiving the deregistration request;

decrementing, at the server, the current registered device count in response to unregistering the electronic lock device; and transmitting, from the server, an unregistered status to the application running on the mobile computing device to remove the second site specific key from the electronic lock device corresponding to the deregistration request.

11. A system, comprising:

a server structured to host a web portal and communicate with a host computing device and a mobile computing device via the web portal, the mobile computing device structured to communicate with one or more electronic locks and the web portal via an application installed on the mobile computing device;

wherein the web portal is structured to:
receive a maximum lock device threshold from the host computing device;
transmit a first site specific encryption key to the host computing device;
receive a registration request that corresponds to one of the electronic locks from the application on the mobile computing device; and
in response to a current registered device count being less than the maximum lock device threshold, register the electronic lock, increment the current registered device count, and transmit a second site specific encryption key to the electronic lock via the application installed on the mobile computing device; and wherein the host computing device is structured to communicate with registered electronic locks using the first and second site specific encryption keys.

12. The system of claim 11, wherein the web portal includes a database structured to store the maximum lock device threshold, the current registered device count, and the first site specific encryption key; and wherein the web portal further includes a cloud application structured to communicate with the host computing device.

13. The system of claim 11, wherein the host computing device includes a database structured to store lock information corresponding to each of the electronic locks.

14. The system of claim 11, wherein the web portal is further structured to:

receive a deregistration request that corresponds to one of the registered electronic locks from the application on the mobile computing device;

unregister the electronic lock corresponding to the deregistration request; and decrement the current registered device count.

15. The system of claim 11, wherein the host computing device is authorized to communicate with each of the registered electronic locks.

16. The system of claim 15, further comprising a gateway structured to facilitate communication between the host computing device and each of the registered electronic locks.

17. The system of claim 11, wherein the mobile computing device comprises one of a smartphone and a tablet computer.

18. At least one non-transitory machine-readable storage medium comprising a plurality of instructions stored thereon that, in response to execution by a server, causes the server to:

receive a maximum lock device threshold from a host computing device;

generate a site specific encryption key;

transmit a first site specific encryption key to the host computing device receiving the registration request;

receive a registration request corresponding to an electronic lock device from an application running on a mobile computing device, the mobile computing device in data communication with the electronic lock device; and in response to a current registered device count being less than the maximum lock device threshold, (i) register the electronic lock device, (ii) increment the current registered device count at the server, and (iii) transmit a second site specific encryption key to the registered electronic lock device via the application running on the mobile computing device;

wherein the first and second site specific encryption keys allow the host computing device and the electronic lock device to communicate.

19. The at least one non-transitory machine-readable storage medium of claim 18, wherein the plurality of instructions further causes the server to:

receive a deregistration request for a registered electronic lock device through the application running on the mobile computing device;

unregister the registered electronic lock device corresponding to the deregistration request; and decrement the current registered device count.

20. The at least one non-transitory machine-readable storage medium of claim 18, wherein the maximum lock device threshold is a site-specific device threshold.

* * * * *